(12) United States Patent
Fu

(10) Patent No.: US 10,421,565 B2
(45) Date of Patent: Sep. 24, 2019

(54) APPARATUS AND METHOD FOR THE DETECTION OF LEAKS IN A SEALED CAPSULE

(71) Applicant: 2266170 Ontario Inc., Mississauga (CA)

(72) Inventor: Yucheng Fu, Mississauga (CA)

(73) Assignee: 2266170 Ontario Inc., Mississauga (CA)

( * ) Notice: Subject to any disclaimer, the term of this patent is extended or adjusted under 35 U.S.C. 154(b) by 296 days.

(21) Appl. No.: 15/163,787

(22) Filed: May 25, 2016

(65) Prior Publication Data

US 2016/0349138 A1 Dec. 1, 2016

Related U.S. Application Data

(60) Provisional application No. 62/166,047, filed on May 25, 2015.

(51) Int. Cl.
| | |
|---|---|
| *B65B 31/00* | (2006.01) |
| *G01L 9/06* | (2006.01) |
| *G01M 3/02* | (2006.01) |
| *G01M 3/36* | (2006.01) |
| *B65B 31/02* | (2006.01) |
| *B65B 29/02* | (2006.01) |

(52) U.S. Cl.
CPC ............ *B65B 31/00* (2013.01); *B65B 29/022* (2017.08); *B65B 31/028* (2013.01); *G01L 9/06* (2013.01); *G01M 3/027* (2013.01); *G01M 3/363* (2013.01)

(58) Field of Classification Search
CPC ....... B65B 29/02; B65B 29/022; B65B 31/00; B65B 31/028; G01L 9/06; G01M 3/027; G01M 3/363; G01M 3/329; G01M 3/36; G01M 3/24; G01M 3/3272
USPC ..................................... 73/49.3, 52
See application file for complete search history.

(56) References Cited

U.S. PATENT DOCUMENTS

| | | | |
|---|---|---|---|
| 3,837,315 A | 9/1974 | Massage | |
| 4,663,964 A | 5/1987 | Croce | |
| 4,709,578 A | 12/1987 | Iwasaki et al. | |
| 4,747,299 A | 5/1988 | Fox et al. | |
| 4,899,574 A * | 2/1990 | Potteiger ............... | G01M 3/363 73/49.3 |
| 4,901,558 A | 2/1990 | Leining et al. | |
| 4,955,226 A * | 9/1990 | Beaty ..................... | G01M 3/36 73/49.3 |

(Continued)

*Primary Examiner* — John Fitzgerald
*Assistant Examiner* — Truong D Phan
(74) *Attorney, Agent, or Firm* — Manelli Selter PLLC; Edward Stemberger

(57) ABSTRACT

An apparatus and method is provided for the detection of a leak between a container and a flexible cover secured about an opening in the container. The apparatus comprises a vacuum chamber for receiving the container, a pressure indicating sensor coupled to a controller; and a sensor support. The sensor is positioned on the sensor support wherein, in operation, the sensor is located in close proximity to the container cover such that when the container is within the vacuum chamber and subjected to a vacuum condition, gases within the container cause the cover to expand at the location of a leak between the cover and the container. Upon contact with the cover the sensor generates a signal received by the controller to indicate both the detection and the location of the leak about the opening in the container.

20 Claims, 13 Drawing Sheets

(56) References Cited

U.S. PATENT DOCUMENTS

| | | | |
|---|---|---|---|
| 5,105,654 A | | 4/1992 | Maruyama et al. |
| 5,150,605 A | * | 9/1992 | Simpson .............. G01M 3/329 73/49.3 |
| 5,365,774 A | * | 11/1994 | Horlacher ............ G01M 3/363 73/45.4 |
| 5,513,516 A | * | 5/1996 | Stauffer .............. G01M 3/3218 73/49.2 |
| 5,625,141 A | * | 4/1997 | Mahoney ............. G01M 3/202 73/40.7 |
| 5,861,548 A | * | 1/1999 | Melvin, II ............ G01L 11/04 73/49.3 |
| 6,301,954 B1 | * | 10/2001 | Schuberth ............ G01M 3/18 324/358 |
| 7,614,282 B2 | | 11/2009 | Eliasson |
| 2003/0033857 A1 | | 2/2003 | Franks |
| 2003/0051561 A1 | * | 3/2003 | Weiss ................... G01L 1/205 73/862.046 |
| 2003/0115966 A1 | * | 6/2003 | Ueno ................... A61B 5/1126 73/726 |
| 2007/0107488 A1 | * | 5/2007 | Farrell ................. G01M 3/007 73/1.01 |
| 2008/0038152 A1 | * | 2/2008 | Van Pelt ............... B01L 3/565 285/384 |
| 2012/0022688 A1 | * | 1/2012 | Wong ................... G06N 3/008 700/253 |
| 2013/0041601 A1 | * | 2/2013 | Dintakurti ............ G01M 3/00 702/51 |
| 2014/0260678 A1 | * | 9/2014 | Jentoft ................. G01L 5/16 73/862.046 |
| 2015/0128715 A1 | * | 5/2015 | Kamimura .......... G01L 19/0084 73/754 |
| 2015/0204744 A1 | * | 7/2015 | Kuisma ................ G01L 9/0072 73/718 |

\* cited by examiner

APPARATUS AND METHOD FOR THE DETECTION OF LEAKS IN A SEALED CAPSULE

FIELD

This invention relates to both an apparatus and a method for the detection of leaks in a sealed container, and in one particular embodiment to an apparatus and method for the detection of leaks in the covers or lids of single serving beverage capsules or cartridges.

BACKGROUND

Single serving beverage capsules or cartridges for use in beverage preparation machines are becoming increasingly popular. Such capsules come in a variety of forms for use in the preparation of beverages that include espresso coffee, drip coffee, tea, hot chocolate, soups, etc. In one version, the capsules have a single chamber commonly defined by a plastic or aluminum body having an open top enclosed with a cover formed from a foil, plastic or other polymer. Typically, the chamber is filled with infusion ingredients, such as ground coffee, for producing beverages in a beverage machine. Hot water is injected by the beverage preparing machine into the chamber containing the infusion ingredients, causing the beverage to flow from the capsule into a user's cup or other reservoir.

In the case of single chamber beverage capsules such as those described above, the cover is commonly glued and/or heat sealed to the upper rim of the container. The cover thus seals the contents within the capsule and is pierceable to permit the beverage machine to insert a probe or other device through the cover so that water can be injected into the interior of the chamber. In order to retain the freshness and to prevent spoilage of the ingredients retained within the chamber, the seal between the cover material and the upper rim of the capsule must be of a high integrity. An inferior or incomplete seal may result in a degradation of the freshness of the ingredients, the infiltration of contaminants into the chamber and/or a potential loss of a portion of the capsule's ingredients.

During the manufacturing process for capsules of the above nature, it is thus desirable to perform at least periodic inspections in order to confirm the integrity of the seal of the lid or cover. For many applications a periodic testing and statistical analysis is sufficient. However, in other instances the particular material retained within the capsule, its inherent value, and its likelihood to suffer spoilage if exposed to the environment, may necessitate a complete testing of all capsules on an assembly line.

Others have proposed a wide variety of different methods to test for leaks in such containers, and in particular, leaks in the seal between the upper rim of the container or capsule and its cover or lid. Where the capsule contains dry goods (for example coffee, tea, hot chocolate, etc.) there will also be air or other gas present within the sealed chamber. Even where the capsule contains a liquid, there will typically be some degree of air or gas at the top of the container. In such cases a common method for leak detection is to submerge sealed capsules into a water tank and observe any bubbles emanating from the containers. Bubbles from the container will indicate the escape of gas through a breach. Although this method of water testing can be relatively simple and effective, it is slow and laborious and is impractical to conduct on a large scale or on the entire production of capsules or containers. Water testing is therefore, for the most part, restricted to a random sampling and a statistical analysis applied to the results of that random sampling. Further, while such methods will generally identify leaks, they do little to indicate the position or precise location of the leak. Since most of the capsules or containers in the nature of those described above are formed, filled and sealed on an assembly line, the location of a particular leak can be important for troubleshooting a potential problem in the manufacturing process. A leak at the same particular location on multiple capsules may indicate a problem in the sealing stage of the assembly process (for example a lack of sufficient heat at a particular location, the lack of an adequate application of adhesive, etc.).

Although a significant use for such capsules is in the beverage making industry, there are a wide variety of other applications of sealed containers for which leak testing is desirable. Many of those applications are in the food industry where products such as juices, individual fruit or dessert servings, yogurt, individual cheese packages, etc. are often stored in containers or capsules having a hermetically sealed and flexible lid or cover. Capsules or containers where a high integrity seal is often required are also used in the pharmaceutical industry, as well as a number of other industries.

Accordingly, there is constantly the need for new methods and devices to assist in the detection of leaks in hermetically sealed containers.

SUMMARY

In one aspect there is provided an apparatus for the detection of a leak between a container and a flexible cover secured about an opening in the container, the apparatus comprising:

a vacuum chamber for receiving the container;

a pressure indicating sensor coupled to a controller; and a sensor support, said sensor positioned on said sensor support wherein, in operation, said sensor is located in close proximity to the container cover such that when the container is within said vacuum chamber and subjected to a vacuum condition, gases within the container cause the cover to expand at the location of a leak between the cover and the container whereby the cover contacts said sensor, upon contact with the cover said sensor generating a signal received by the controller to indicate both the detection and the location of the leak about the opening in the container.

In another aspect there is provided a method for the detection of a leak between a container and a flexible cover secured to a rim about an open top of the container, the method comprising:

(i) locating the container within a vacuum chamber;

(ii) positioning a pressure indicating sensor in close proximity to at least the portion of the cover that is secured to the rim of the container;

(iii) establishing a pre-determined vacuum pressure within the vacuum chamber; and (iv) detecting contact between a portion of the cover adjacent to the upper rim of the container and the pressure indicating sensor, said contact indicating an expansion in the container cover at said point of contact resulting from the passage of gas from within the container through a leak between the cover and the rim of the container.

In another aspect there is provided an apparatus for the detection of a leak between a container and a flexible cover secured about an opening in the container, or a leak within the flexible cover, the apparatus comprising:

a vacuum chamber for receiving the container, said vacuum chamber comprising a manufacturing line element in an assembly line for the production of single serving beverage containers;

one or more pressure indicating sensors coupled to a controller; and one or more sensor supports, said one or more sensors positioned on said one or more sensor supports, wherein, in operation, said one or more sensors are located in close proximity to the cover, when the container is within said vacuum chamber and subjected to a vacuum condition gases within the container cause the cover to expand whereby the cover contacts said one or more sensors, upon contact with the cover said one or more sensors generating one or more signals received by the controller, said controller calculating a contact pressure between said one or more sensors and the cover and comparing said contact pressure to a per-determined pressure to indicate the presence of a leak.

In another aspect there is provided a method for the detection of a leak between a container and a flexible cover secured to a rim about an open top of the container, or a leak in the flexible cover, the method comprising:

(i) locating the container within a vacuum chamber;

(ii) positioning one or more pressure indicating sensors in close proximity to the cover;

(iii) establishing a pre-determined vacuum pressure within the vacuum chamber; and (iv) detecting contact between the cover and the one or more pressure indicating sensors, upon contact said one or more sensors generating one or more pressure signals received by a controller, said controller comparing said one or more pressure signals with a predetermined value, whereby said generated one or more pressure signals being less than said predetermined value indicating a leak between the cover and the rim of the container, a leak within the cover or a leak within the container.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION OF AN EXAMPLE EMBODIMENT

The present invention may be embodied in a number of different forms. The specification and drawings that follow describe and disclose some of the specific forms of the invention.

In the following description, and in the accompanying drawings, the apparatus and method of the present invention is described in so far as it relates to a single serving beverage capsule, such as those that are used in the preparation of coffee, tea, hot chocolate and other types of infusion beverages. However, one of ordinary skill in the art will appreciate from a thorough understanding of the invention that the inventive apparatus and method could equally be used on any one of a wide variety of other sealed capsules, cartridges or containers.

Figure 1:
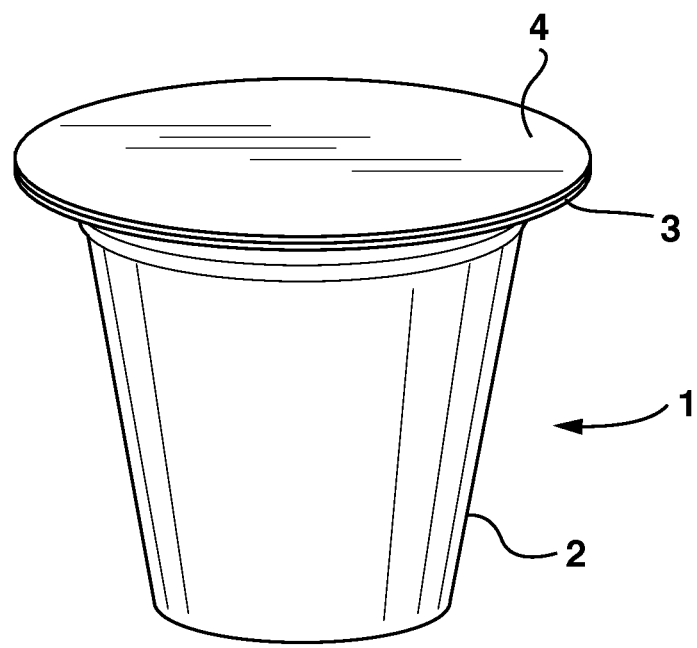
FIG. 1 is a side perspective view of a typical or representative single serving beverage capsule.

For illustration purposes, FIG. 1 shows a relatively standard single serving beverage capsule 1. Capsule 1 is comprised generally of a rigid or semi-rigid body 2 having an open top circumscribed by an upper rim 3. A cover or lid 4 is secured to rim 3, typically through the use of adhesives and/or heat sealing means. In most instances rim 3 and cover 4 are circular in shape.

Figure 2:
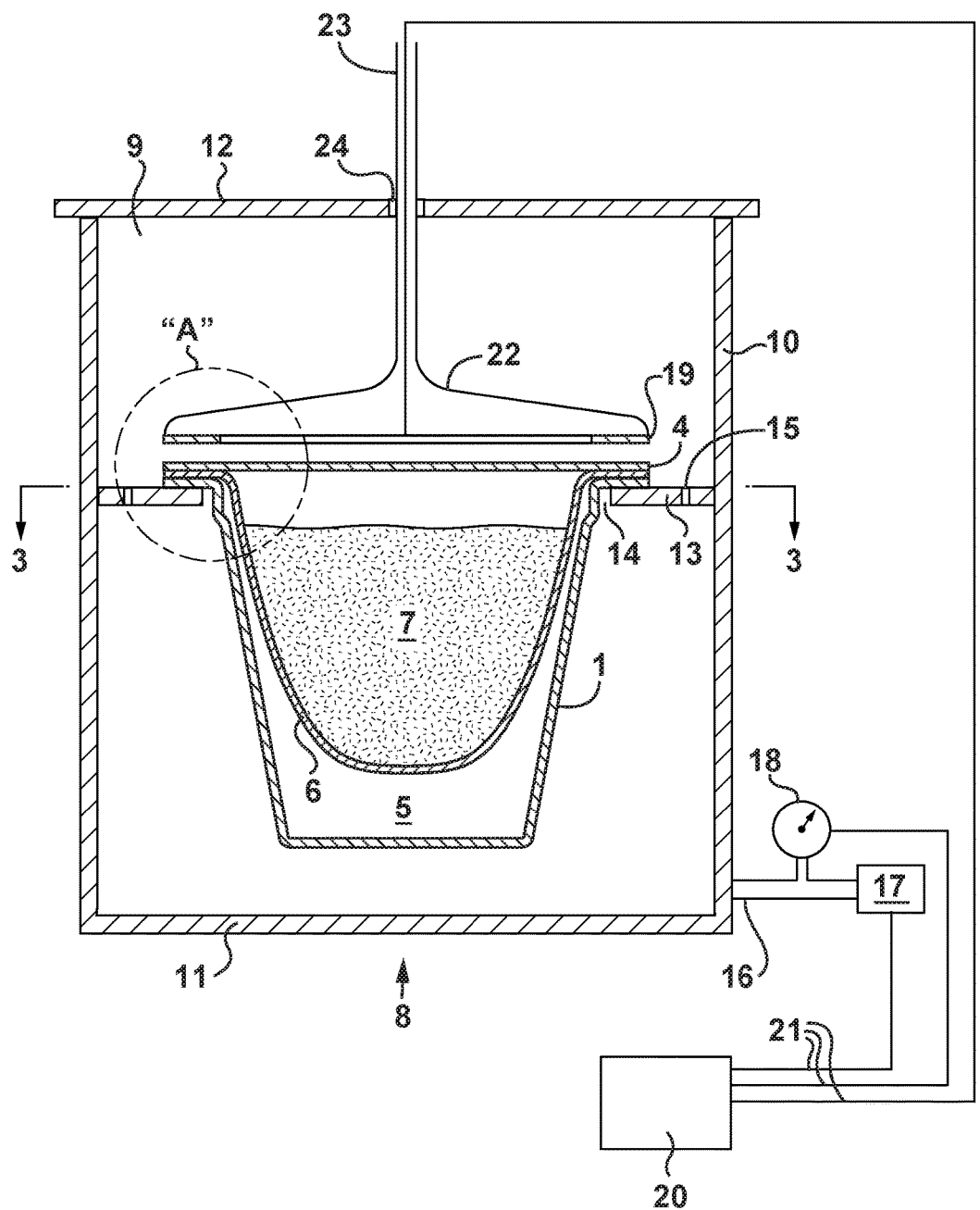
FIG. 2 is a vertical sectional view through a leak detection apparatus constructed in accordance with an embodiment of the invention.
Figure 3:
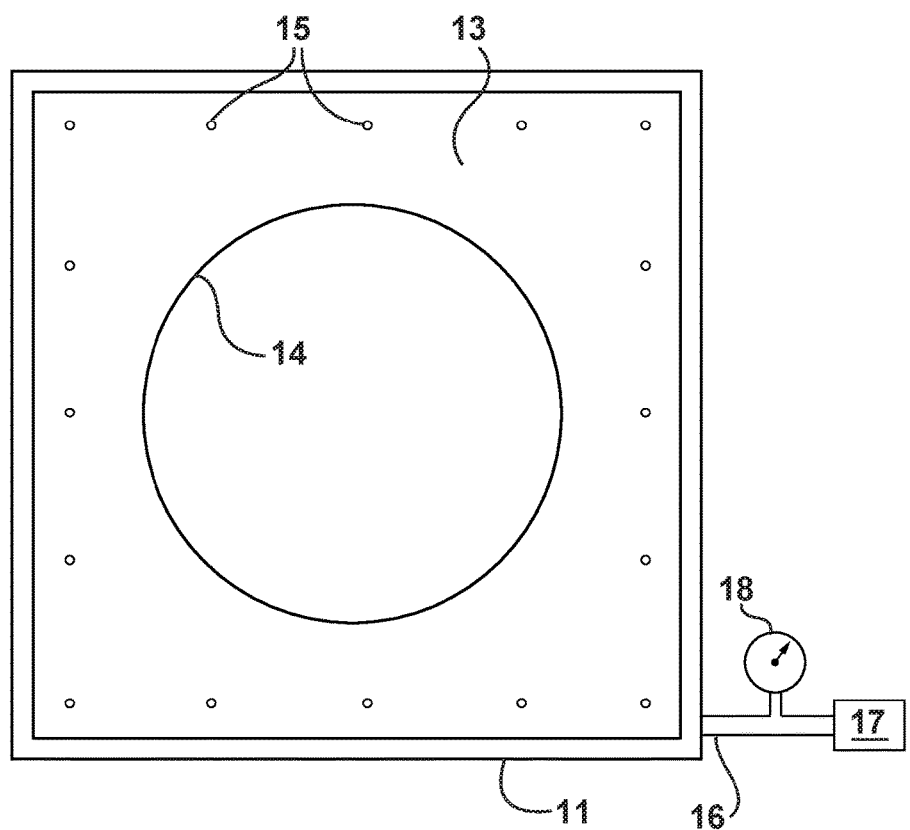
FIG. 3 is a sectional view taken along the line 3-3 of FIG. 2.

As is shown in FIG. 2, body 2 forms an ingredients chamber 5 that typically includes a filter 6 forming a pocket or receptacle into which one or more ingredients (for example coffee grounds, ground tea, etc.) are received. The edge of the filter may be placed over rim 3 with the combination of cover 4, filter 6 and rim 3 adhered together. Alternately, filter 5 may be secured to an interior facing surface of body 2 or cover 4.

In accordance with one embodiment of the invention there is provided an apparatus 8 for the detection of a leak between rim 3 and cover 4. Apparatus 8 includes a vacuum chamber 9 that may have a variety of different configurations. In the attached drawings chamber 9 includes side walls 10, a bottom 11 and a removable and sealable top 12. It will be appreciated from a thorough understanding of the invention that top 12 can be removed or "opened" to allow access to the interior of chamber 9 to insert and/or retrieve capsules 1. In one embodiment, chamber 9 includes a horizontal baffle 13 having an opening 14 to receive and support capsule 1 through the resting of rim 3 upon the upper surface of the baffle. The baffle will act as a capsule or specimen support and also preferably includes a series of pressure equalizing holes or openings 15 to equalize the pressure above and below the baffle when the baffle is supporting a capsule. Interior of chamber 9 is connected via a conduit 16 to a vacuum pump 17 that is operable to initially draw vacuum upon the interior of chamber 9, and to subsequently re-pressurize a chamber if required (in some cases chamber 9 may simply include a valve to permit exterior air to be drawn into the chamber to re-pressurize it). A pressure gauge 18 may be present to provide a visual indication of the pressure or extent of the vacuum within chamber 9.

Apparatus 8 further includes a pressure indicating sensor 19 that is coupled to a controller 20. In the embodiment of the invention shown, sensor 19 is a tactile pressure indicating sensor film or a piezoelectric film sensor. Coupling of the sensor to the controller may be through the use of electrical conductors 21. Conductors 21 may also be used to couple pressure gauge 18 and vacuum pump 17 to the controller.

Figure 4:
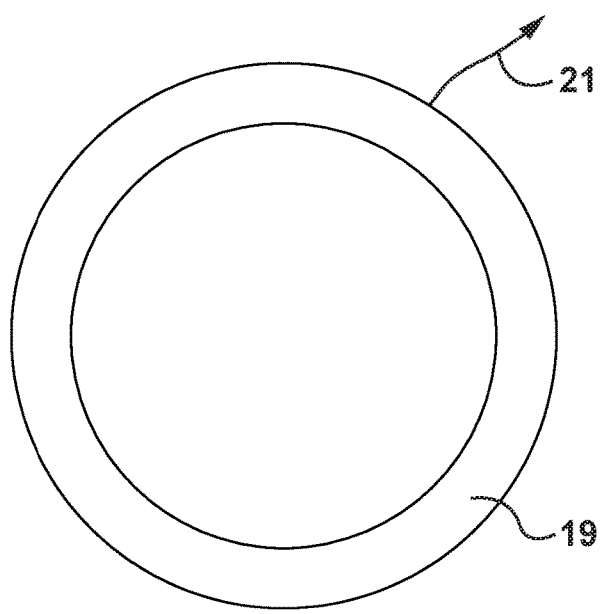
FIG. 4 is a plan view of an embodiment of a film sensor for use in the apparatus of FIG. 2.

In one embodiment film sensor 19 will generally have a shape that is complimentary to that of rim 3 (i.e. both the rim and the sensor may be generally circular). The sensor may effectively be of a size and shape that is essentially the same as that of the entirety of cover 4 or, in an alternate embodiment, the sensor may be smaller than the cover such that it is interior to rim 3. In a further alternate embodiment the film sensor could be of a size that is greater than that of rim 3 so that a single sensor could be used to monitor multiple capsules or specimens. In the embodiment shown in FIG. 4, the sensor is in the form of a ring which is generally sized and configured to be of a shape and dimension such that the sensor can be placed in close proximity and adjacent to rim 3 of capsule 1.

In order to position and locate the sensor, apparatus 8 may include a sensor support 22 which is generally in the form of a round piston to which the film sensor is mounted or otherwise secured. Sensor support 22 is mounted to a control rod 23 that extends through top 12 of chamber 9. Control rod 23 may be operatively connected to a mechanical, electro-mechanical, pneumatic or hydraulic system that raises and/or lowers sensor support 22 in order to place sensor 19 at a desired distance above the upper surface of cover 4. The integrity of the vacuum chamber is preserved through the positioning of a seal 24 about control rod 23 in vacuum chamber top 12. In an alternate embodiment, the sample or capsule holder or support may move up and down to engage the sensor.

Figure 5:
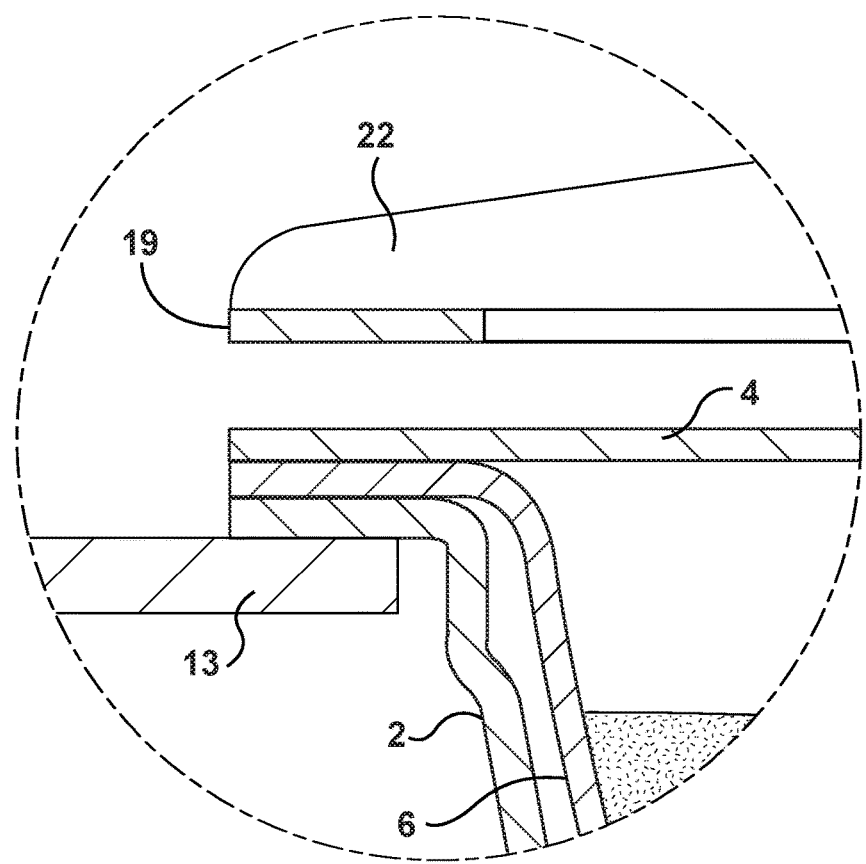
FIG. 5 is an enlarged detail view of portion "A" of FIG. 2 prior to the operation of the leak detection apparatus.

FIG. 5 shows an enlarged detail view of portion "A" of FIG. 2 where the vacuum chamber is in a condition of atmospheric pressure. Here, the sensor is set-off a predetermined distance from cover 4 such that the sensor does not sense contact with the cover.

Figure 6:
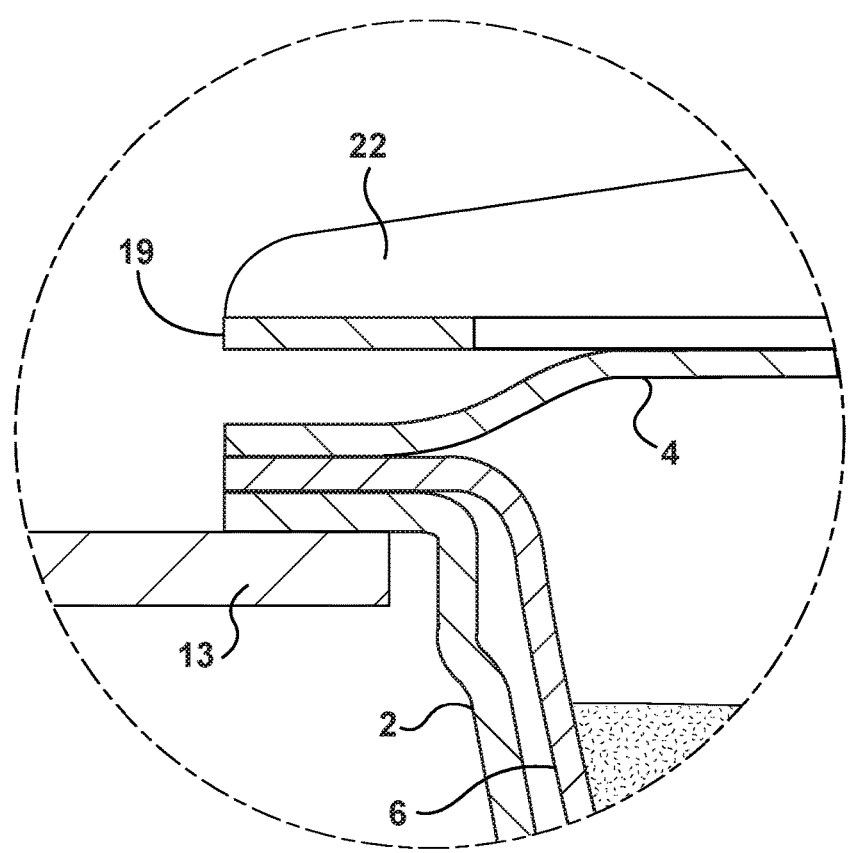
FIG. 6 is an enlarged detail view similar to FIG. 5 during operation of the apparatus wherein no leak is being detected in the seal between the beverage capsule rim and the capsule's cover.

FIG. 6 is a view similar to FIG. 5 wherein vacuum chamber 9 is in a condition of negative pressure or vacuum, and wherein the seal between the cover and rim 3 is intact and holding. In this instance the vacuum condition within chamber 9 causes the gas within capsule 1 to expand, driving the cover in an upward direction. Where sensor 19 is in the shape of a ring that is dimensioned to generally coincide with the size of rim 3, the expansion of cover 4 will not contact the sensor, once again resulting in the sensor not detecting physical contact. In the case of FIG. 6, controller 20 would indicate no leak.

Figure 7:
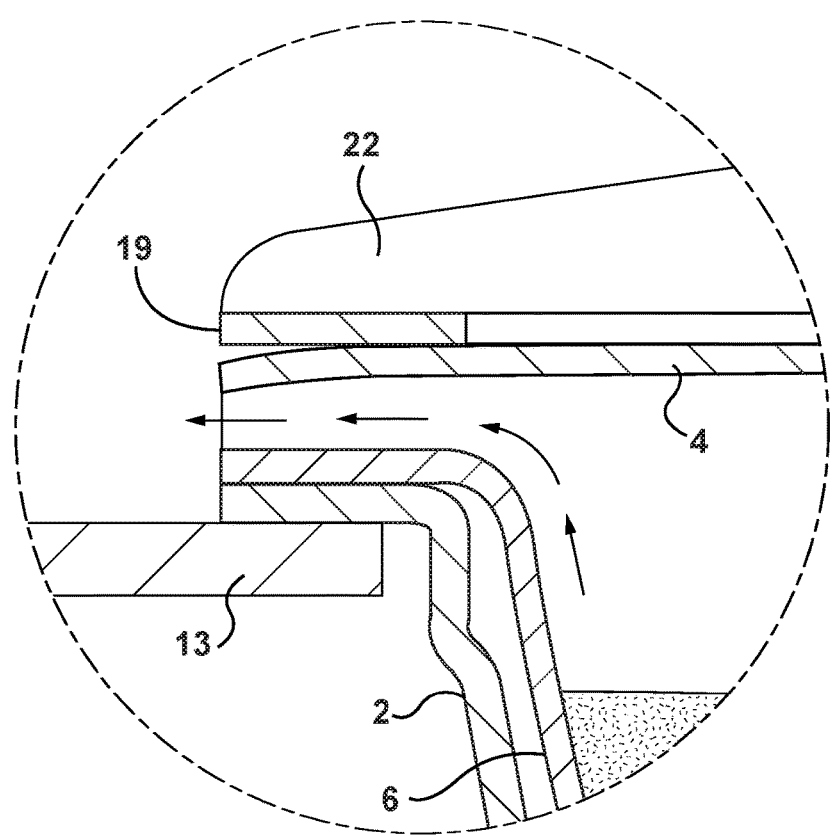
FIG. 7 is an enlarged detail view similar to FIG. 6 wherein a leak is being detected at a portion along the rim of the beverage capsule.

FIG. 7 is a view similar to FIG. 6 wherein the vacuum chamber is in a condition of vacuum. However, in this instance the seal between the cover and the upper rim of the capsule is not intact. Here, the expanding gases within capsule 1 cause the portion of the cover immediately above a portion of rim 3 where the seal is broken to expand upwardly to permit the gases to escape (as shown by means of the arrows in FIG. 7). It will be appreciated that for illustration purposes FIG. 7 shows an exaggerated condition and that in practice the leak will in many cases entail a small channel that will only displace the rim by a very small amount. That portion of the cover at the point of the leak expands and contacts sensor 19. The sensor thus detects contact with the cover and generates a signal that is forwarded to controller 20. Controller 20 interprets the signal as a leak and a breach in the seal between the cover and upper rim 3.

It will be appreciated that through the use of a tactile pressure indicating sensor film the location of the contact between the expanding cover 4 and the sensor can be determined such that the location of the leak about the circumference of the rim will be known. That is, not only will the sensor indicate the presence of a leak, but also the location of the leak. It will further be appreciated that determining the position of a leak may be important from a manufacturing perspective as it will allow a comparison of leaks in multiple containers to determine whether there may be a flaw in the manufacturing of the covers, in the formation of the capsule bodies, in the sealing mechanism or steps used to seal the cover to the upper rim, etc. Pressure indicating sensor 19 may also permit a determination, or mapping, of multiple leaks that may exist at more than one location about the circumference of the cover.

Determining and comparing the relative position of leaks in different containers (as discussed above) can be facilitated when the containers are similarly oriented when being tested. Alternately, the containers and/or their covers could contain orientating features (a tab, a bar code, magnetic ink, a dimple, embossing, etc) from which the relative position of a leak on one container might be compared with a leak in a different container.

One of ordinary skill in the art will understand that it will be necessary to determine a desired degree of set-off between sensor 19 and cover 4 when vacuum chamber 9 is at atmospheric pressure. The degree of set-off will vary from application to application and will be effected by factors that include the relative flexibility and modulous of elasticity of the material from which cover 4 is created, the extent of the vacuum that will be formed within chamber 9, the seal between the cover and the upper rim of the capsule, the relative amount of gas in the capsule or container, etc.

Figure 8:
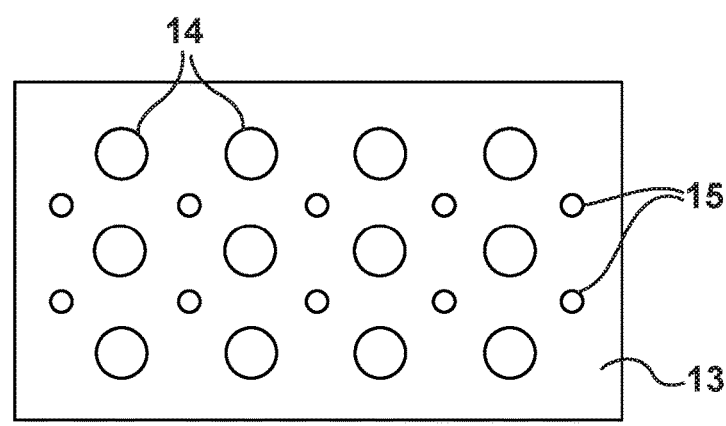
FIG. 8 is a plan view of the baffle for use in the apparatus, designed to simultaneously test a plurality of capsules.

Although FIG. 1 depicts an apparatus utilized for testing a single capsule 1, apparatus 1 may alternately be configured to simultaneously test a plurality of capsules. For example, FIG. 8 shows an embodiment of baffle 13 where apparatus 1 can be used for simultaneously testing 12 separate capsules.

Figure 9:
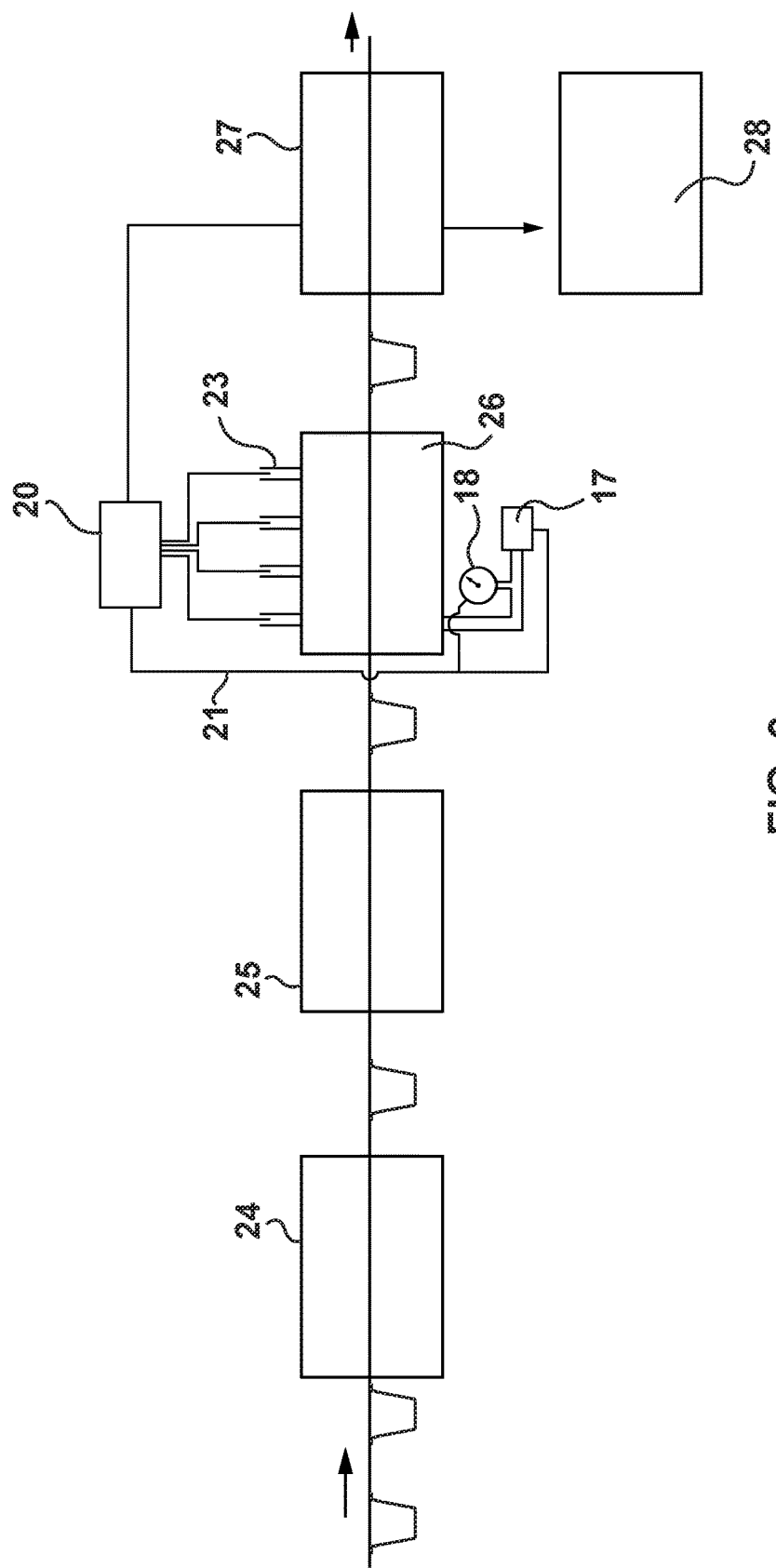
FIG. 9 is a schematic view of an assembly line for single serving beverage capsules that incorporates a dedicated leak detection stage.
Figure 10:
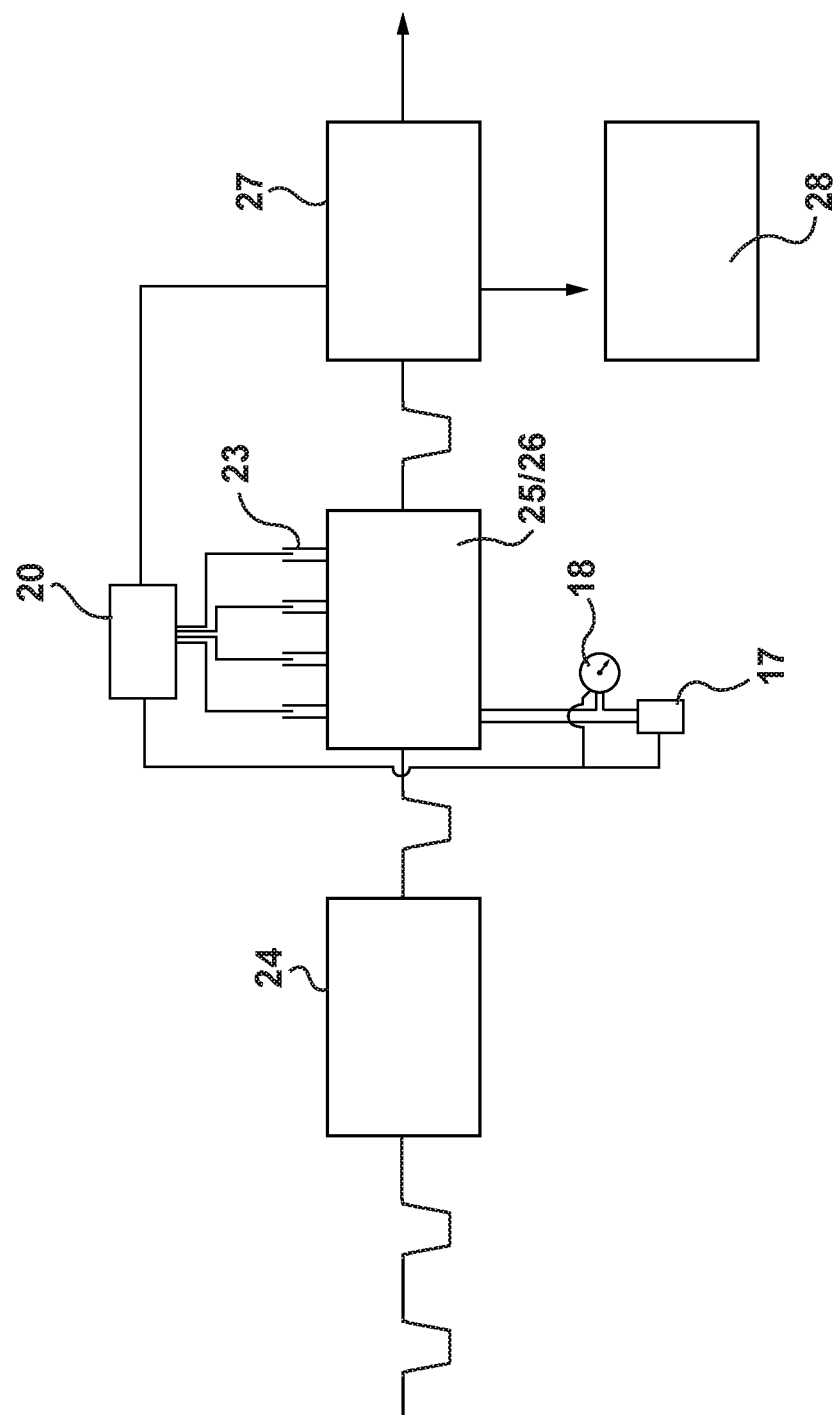
FIG. 10 is a view similar to FIG. 9 wherein the leak detection stage is incorporated into the capsule sealing stage.

In some applications it may be desirable to incorporate apparatus 1 into an assembly line for the production of the capsules. FIGS. 9 and 10 schematically show but two examples of an assembly line within which an apparatus constructed in accordance with an embodiment of the invention may exist. In FIG. 9 the assembly line contemplates a conveyor-type assembly line where capsules progressively proceed from a fill station 24 to a seal station 25. After exiting the seal station 25, the capsules enter test station 26 that incorporates an embodiment of the invention described above. As the capsules exit testing station 26 they enter a rejection and packaging station 27 where capsules that have been identified as containing leaks are rejected and sent to a rejection storage bin 28, with the remainder of the capsules packaged and prepared for transport.

FIG. 10 shows a similar assembly line wherein the seal station 25 and test station 26 have been combined into a single station or unit. In the case of the assembly lines shown in both FIG. 9 and FIG. 10, controller 20 may be used to not only operate apparatus 8 and test station 26, but it may also be used to operate rejection and packaging station 27. That is, where leaks are detected in one or more capsules, controller 20 will determine not only the location of the leak about the circumference of the individual capsule, but also which of the individual capsules amongst many capsules travelling along the conveyor system that contain leaks. As those capsules are then transported by the conveyor system into the rejection and packaging station, the individual capsules for which leaks have been detected can be ejected from their position on the conveyor (through pneumatic, hydraulic, mechanical or electromechanical means) permitting the remaining capsules to travel along the conveyor to be packaged.

Figure 11:
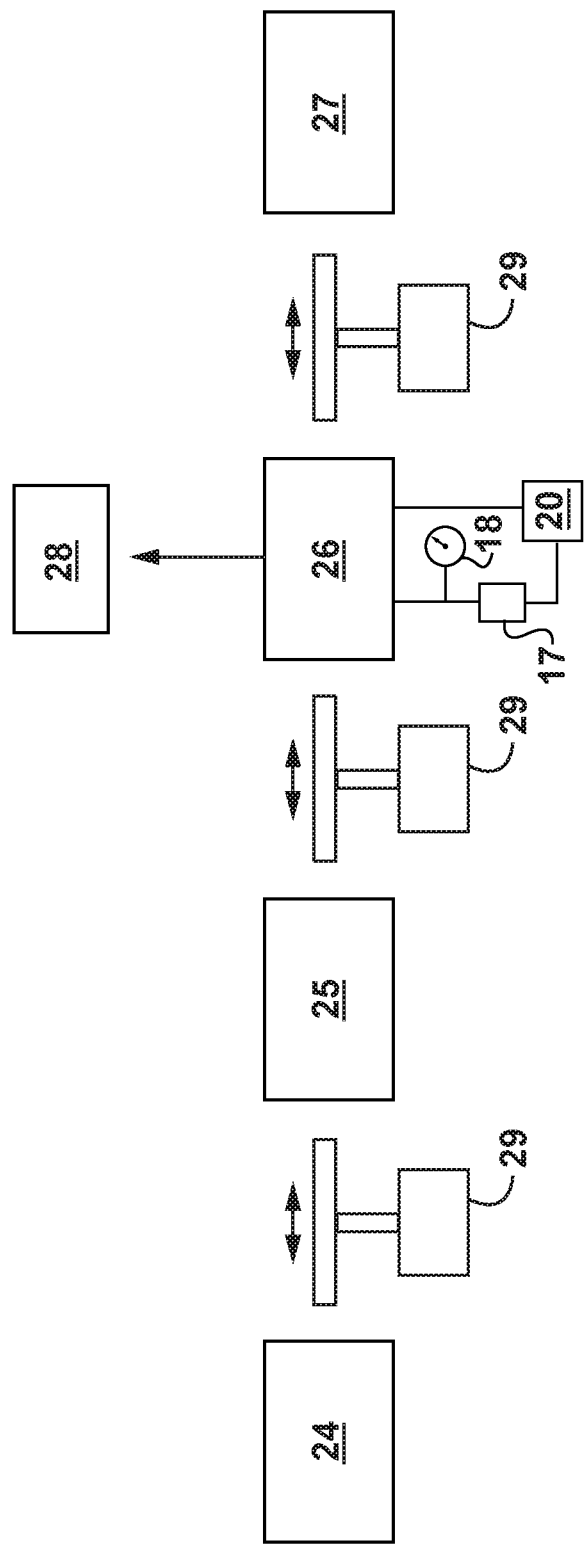
FIG. 11 is a schematic view of an alternate form of assembly line to that shown in FIG. 9.

FIG. 11 shows an alternate assembly line to that shown in FIG. 9. Here, the assembly line is comprised of a series of dedicated stations, comprising a fill station 24, a seal station 25, a test station 26, and a packaging station 27. Capsules 1 may be transported from station to station through operation of a linear transfer 29, or through other such mechanisms used in assembly line applications to move objects from one station to the next.

Figure 12:
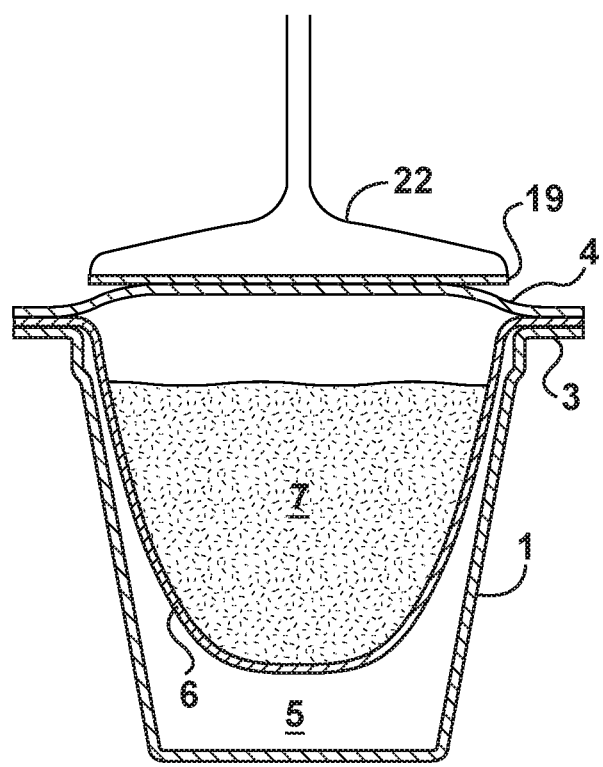
FIG. 12 is an alternate embodiment to that shown in FIGS. 6 and 7.

FIG. 12 shows an alternate embodiment. In this embodiment sensor 19 is a tactile pressure indicating or piezoelectric film sensor. Sensor 19 may generally have a shape and size approximating that portion of cover or lid 4 that is interior to upper rim 3 of capsule 1 (as shown in FIG. 12), or it may be generally the same size as, or even slightly larger than, cover 4. If desired the sensor could also be of a size such that a single sensor could be used to "test" multiple capsules or specimens. As in the case of the previously described embodiment, sensor 19 may be positioned in close proximity to, and at a desired distance above, the upper surface of cover 4. Alternately, the sensor may be placed into contact with the upper surface of cover 4.

In the embodiment of FIG. 12, when capsule 1 is positioned within vacuum chamber 9 and the vacuum chamber is in a condition of atmospheric pressure, sensor 19 will either be set-off a predetermined distance from cover 4 such that the sensor does not detect contact, or the sensor will be in contact and recording a predetermined level of "pressure" between the sensor and the cover. As a vacuum is drawn upon chamber 9, interior pressure within capsule 1 will increase and either cause cover 4 to expand and contact sensor 19 (in the case where there had not previously been contact) or increase the force or "pressure" recorded between the cover and the sensor. The sensor will then forward a pressure signal to controller 20 for the recording of a sensed pressure. In the event of a leak the cover will either not contact sensor 19 (at or around the location of the leak where the sensor has been set-off from the cover), or the force or pressure recorded by the sensor through contact with the cover will be less than the case where there is no leak (in situations where the sensor is initially in contact with the cover). That is, where there is a leak, the force tending to move the cover upwardly toward the sensor will be less as gas from within the interior of the capsule will escape through the leak.

Figure 13:
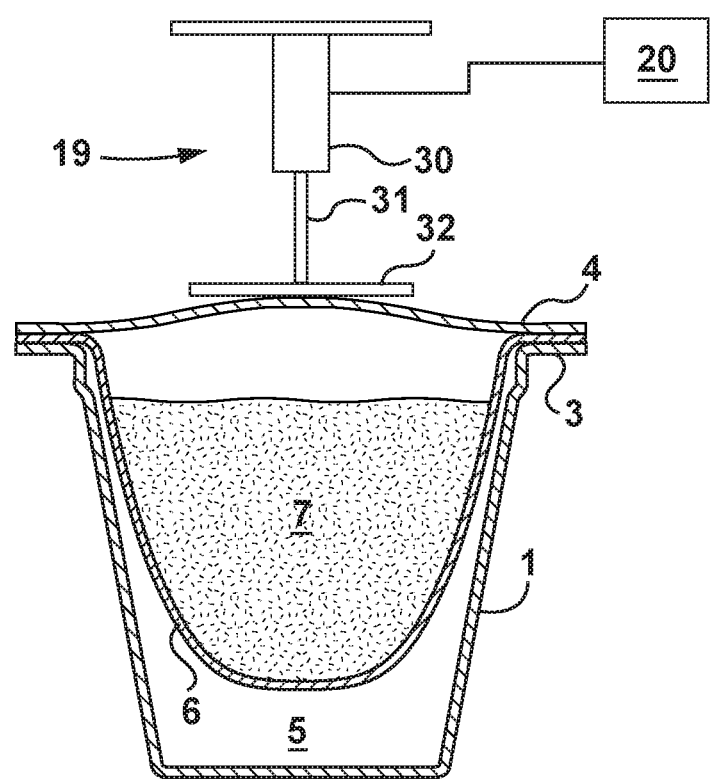
FIG. 13 shows still a further alternate embodiment of the invention wherein the sensor is a displacement sensor.

Controller 20 will thus be capable of indicating whether there is a leak through recording the pressure of the contact between cover 4 and sensor 19 and comparing that value to a predetermined standard pressure observed in the case where there is no leak. Sensor 19 may also be constructed with multiple detection points about its surface for purposes of determining the specific position of a leak. Referring to FIG. 13, there is shown yet a further alternate embodiment of the invention. Here, sensor 19 is any one of a variety of different forms of displacement sensor (including a resistive linear position transducer or an eddy-current displacement sensor). Strictly for illustration purposes, in FIG. 13 sensor 19 is shown as comprised of a hydraulic or pneumatic ram 30 having a shaft 31 attached to a plate 32. It will be appreciated that the structure and configuration of the sensor could be other than that as specifically shown in FIG. 13. Further, if desired, multiple sensors could be used to test a single capsule.

In the embodiment of FIG. 13, when capsule 1 is positioned within vacuum chamber 9 and the vacuum chamber is in a condition of atmospheric pressure, plate 32 will be positioned immediately adjacent to or in slight contact with the upper surface of cover 4. As a vacuum is drawn upon chamber 2, the interior pressure within capsule 1 will cause cover 4 to expand upwardly, forcing shaft 31 into ram 30. Internal sensors within the ram (which may be pressure sensors, positioning sensors, etc.) sense the movement of rod 31 and transmit a pressure signal to controller 20 which records the pressure applied by expanding cover 4 to plate 32.

In some instances it may be desirable to pre-record the pressure exerted by an expanding cover against the plate for a given vacuum pressure where there is no leak in the cover, in the seal between cover 4 and rim 3 or in the container or capsule. That pressure can then be stored within controller 12 as a standard against which measured pressures when testing individual capsules can be compared. In the event of a leak in the cover and/or the seal between the cover and upper rim 3 and/or the container, the pressure applied by the cover to plate 32, and ultimately recorded by controller 20, will be reduced as a portion of the expanding gas within capsule 1 will be allowed to escape through the leak. Accordingly, should controller 20 sense a reduced pressure when compared to the standard, an alarm or other indicating means can be triggered to signify that the particular capsule in question contains a leak. Where that capsule is in an assembly line, it may be rejected from the line and sent to a rejection storage bin.

It will be appreciated by those of ordinary skill and having an appreciation of the invention that, if desired, a number of displacement sensors could be positioned about the surface of a capsule 1. Where multiple sensors are used, a difference in the measured pressure between respective sensors could be used to help locate the position of a leak about the surface of the cover, much as in the case of the embodiment where the sensor is a piezoelectric film sensor containing multiple detection points about its surface.

It is to be understood that what has been described are the preferred embodiments of the invention. The scope of the claims should not be limited by the preferred embodiments set forth above, but should be given the broadest interpretation consistent with the description as a whole.

I claim:

1. An apparatus for the detection of a leak between a capsule and a flexible cover secured to a rim about an opening in the capsule, the apparatus comprising:
    a vacuum chamber for receiving the capsule;
    a pressure indicating sensor coupled to a controller, said sensor having a size and shape that is essentially the same as the size and shape of the rim of the container; and
    a sensor support, said sensor positioned on said sensor support wherein, in operation, said sensor is located in proximity, but not in contact with, the capsule cover such that when the capsule is within said vacuum chamber and subjected to a vacuum condition, gases within the capsule cause the cover to expand at the location of a leak between the cover and the rim whereby the cover contacts said sensor, upon contact with the cover, said sensor generating a signal received by the controller to indicate both the detection and the location of the leak about the opening in the capsule.

2. The apparatus as claimed in claim 1 wherein said sensor is a piezoelectric film sensor.

3. The apparatus as claimed in claim 1 wherein the sensor is one or more displacement sensor, resistive linear position transducer or eddy-current displacement sensor.

4. The apparatus as claimed in claim 1 wherein said sensor and said rim have a ring shape.

5. The apparatus as claimed in claim 1 wherein said sensor is coupled to said controller through one or more electrical conductors.

6. The apparatus as claimed in claim 1 wherein said sensor includes a wireless transmitter, said sensor wirelessly coupled to said controller such that said signals generated by said sensor are transmitted wirelessly to said controller.

7. The apparatus as claimed in claim 1 wherein said vacuum chamber comprises an element of an assembly line for the production of the capsule.

8. The apparatus as claimed in claim 1 wherein said vacuum chamber comprises an element of an assembly line for the production of the capsule.

9. The apparatus as claimed in claim 1 wherein said sensor is a tactile pressure indicating sensor film.

10. The apparatus as claimed in claim 9 wherein said vacuum chamber comprises a manufacturing line element in an assembly line for the production of the capsule.

11. An apparatus for the detection of a leak between a capsule and a flexible cover secured to a rim about an opening in the capsule, or a leak within the flexible cover, the apparatus comprising:
   a vacuum chamber for receiving the capsule, said vacuum chamber comprising a manufacturing line element in an assembly line for the production of single serving beverage capsules;
   one or more pressure indicating sensors coupled to a controller, said one or more sensors having a size and shape that is essentially the same as the size and shape of the rim of the capsule; and
   one or more sensor supports, said one or more sensors positioned on said one or more sensor supports,
   wherein, in operation, said one or more sensors are located in proximity to, but not in contact with the cover, when the capsule is within said vacuum chamber and subjected to a vacuum condition gases within the capsule cause the cover to expand whereby the cover contacts said one or more sensors, upon contact with the cover said one or more sensors generating one or more signals received by the controller, said controller calculating a contact pressure between said one or more sensors and the cover and comparing said contact pressure to a per-determined pressure to indicate the presence of a leak.

12. A method for the detection of a leak between a capsule and a flexible cover secured to a rim about an open top of the capsule, or a leak in the flexible cover, the method comprising:
   (i) locating the capsule within a vacuum chamber;
   (ii) positioning one or more pressure indicating sensors in proximity to, but not in contact with the cover, said one or more sensors having a size and shape that is essentially the same as the size and shape of the rim of the container;
   (iii) establishing a pre-determined vacuum pressure within the vacuum chamber; and
   (iv) detecting contact between the cover and the one or more pressure indicating sensors, upon contact said one or more sensors generating one or more pressure signals received by a controller, said controller comparing said one or more pressure signals with a predetermined value, whereby said generated one or more pressure signals being less than said predetermined value indicating a leak between the cover and the rim of the capsule, a leak within the cover or a leak within the capsule.

13. The method as claimed in claim 12 wherein said rim and said one or more sensors are ring shaped.

14. The method as claimed in claim 12 wherein said vacuum chamber comprises a manufacturing line element in an assembly line for the production of single serving beverage capsules, said method comprising a step in the production of said single serving beverage capsules.

15. The method as claimed in claim 14 including rejecting from said assembly line capsules determined to contain a leak.

16. A method for the detection of a leak between a capsule and a flexible cover secured to an upper rim about an open top of the capsule, the method comprising:
   (i) locating the capsule within a vacuum chamber;
   (ii) positioning a pressure indicating sensor in proximity to, but not in contact with, at least the portion of the cover that is secured to the upper rim of the capsule, said sensor having a size and shape that is essentially the same as the size and shape of the upper rim of the container;
   (iii) establishing a pre-determined vacuum pressure within the vacuum chamber; and
   (iv) detecting contact between a portion of the cover adjacent to the upper rim of the capsule and the pressure indicating sensor, said contact indicating an expansion in the capsule cover at said point of contact resulting from the passage of gas from within the capsule through a leak between the cover and the upper rim of the capsule.

17. The method as claimed in 16 wherein the pressure indicating sensor is a tactile pressure indicating sensor film, said method further including the generation of a signal by said sensor upon contact with the cover, transmitting said signal to a controller and, with the controller, identifying the location of the leak about the upper rim of the capsule.

18. The method as claimed 17 including the further step of displaying the location of any detected leak on a monitor or graphical interface.

19. The method as claimed in claim 17 comprising a step in an assembly line for the production of the capsule.

20. The method as claimed in claim 17 comprising a step in a unit utilized for the sealing of the flexible cover to the open top of the capsule.

* * * * *